April 24, 1951     T. W. THORNTON     2,549,863
HYDRO-INERTIA SWITCH

Filed April 12, 1946     3 Sheets-Sheet 1

Inventor
T. W. Thornton

By M. O. Hayes
Attorney

April 24, 1951 T. W. THORNTON 2,549,863
HYDRO-INERTIA SWITCH

Filed April 12, 1946 3 Sheets-Sheet 2

Inventor
T. W. Thornton

By M. O. Hayes
Attorney

Inventor
T. W. Thornton

Patented Apr. 24, 1951

2,549,863

UNITED STATES PATENT OFFICE 2,549,863

HYDRO-INERTIA SWITCH

Theodore W. Thornton, Salt Lake City, Utah

Application April 12, 1946, Serial No. 661,633

10 Claims. (Cl. 200—81.4)

(Granted under the act of March 3, 1883, as amended April 30, 1928; 370 O. G. 757)

This invention relates generally to switching devices and more particularly to a switching device in which a plurality of circuit closing elements are adapted to be operated in response to changes in different physical variables occurring in predetermined sequential order.

A switching device of the aforedescribed character is well adapted for use in a motion recorder such, for example, as the recorder disclosed and claimed in my copending application for Torpedo Motion Recorder, Serial No. 661,634, filed April 12, 1946. These recorders are used to record data on the reactions of internal torpedo mechanisms during the run of a torpedo, the torpedo being of a training type recoverable after each firing.

As employed in the torpedo motion recorder, the switch of the present invention is adapted to initiate the operation of the recorder as the torpedo is launched and to prevent the accidental operation of the recorder previous to the firing of the torpedo. This is accomplished by a mechanism designed to operate upon application of pressure thereto and adapted to operate certain circuit closing means and a second mechanism designed to operate upon application of the set back force of the torpedo when the torpedo is fired and adapted to close certain other circuit closing means, both operations being necessary to actuate the recording mechanism.

It is an object of the present invention to provide an electrical switching device in which a plurality of circuit controlling elements are operated in response to changes in different physical variables occurring in predetermined sequential order.

It is an object of the present invention to provide an electrical switching device in which a plurality of circuit controlling elements are operated in response to changes in different physical variables occurring in predetermined sequential order, and in which the elements are releasably locked in an unoperated position until a change in a preselected one of the physical variables occurs.

Another object of the present invention is to provide a new and improved circuit controlling device for a torpedo in which a plurality of circuits are controlled in predetermined sequential order.

Another of the objects is to provide a new and improved circuit controlling device for a torpedo and adapted to close a plurality of circuits in response to the pressure of the water within which the torpedo is submerged and to close an additional plurality of circuits in response to the set back force within the torpedo as the torpedo is fired from a torpedo firing tube.

A still further object is to provide a device for a torpedo which is adapted to close a plurality of circuits in predetermined sequential order and in which the circuit closing means are normally locked in an unoperated position until released therefrom by the pressure of the water within which the torpedo is submerged.

Still another object is to provide a pressure controlled circuit controlling mechanism for a torpedo in which the release of at least one of the circuit controlling elements is controlled by the set back force of the torpedo as the torpedo is fired from an initial firing position and in which the circuit controlling element is releasably locked in an initial position, until a pressure control has been applied to the mechanism.

Another object is to provide a pressure controlled circuit controlling mechanism for a torpedo in which the release of at least one of the circuit controlling elements is controlled by the set back force of the torpedo as the torpedo is fired from an initial firing position and in which the element is locked in an initial position until a pressure control has been applied to the mechanism, and is prevented from relocking after application of said pressure control.

Still other objects, advantages and improvements will be apparent from the following description taken in connection with the accompanying drawings of which:

Figure 1:
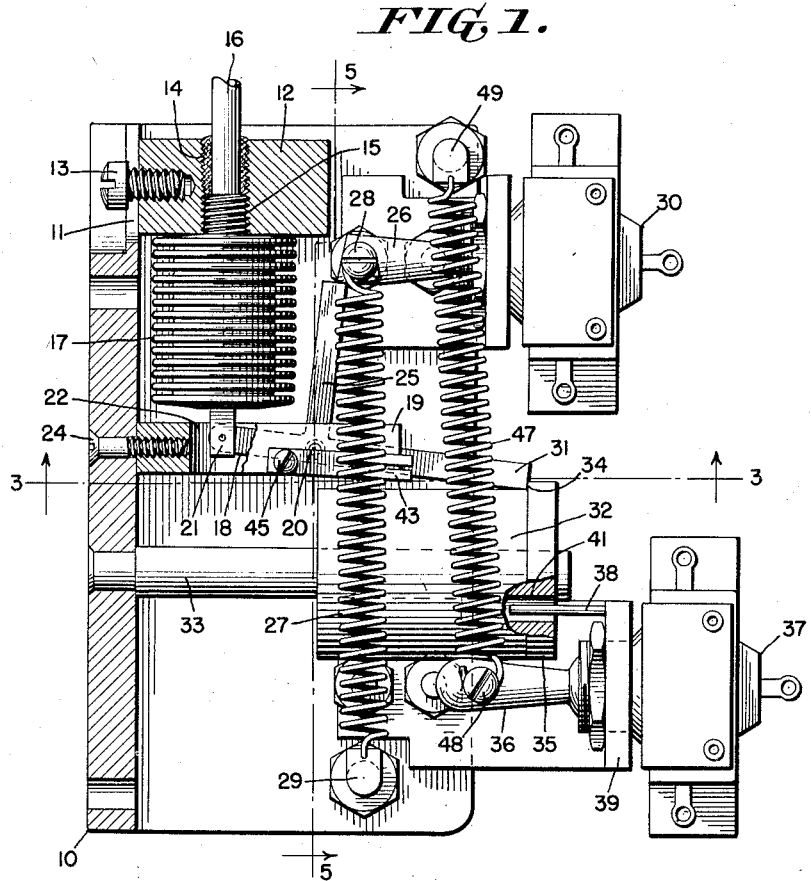
Fig. 1 is a view in elevation with certain parts in section of the device of the present invention according to the preferred embodiment thereof and shows the device in its initial unoperated condition.
Figure 2:
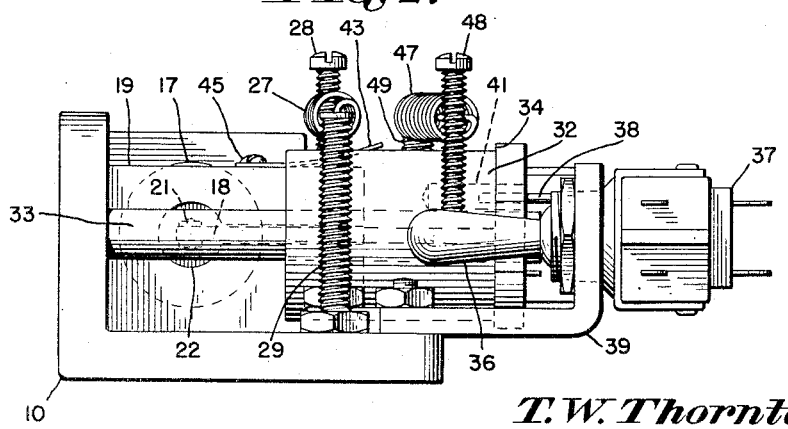
Fig. 2 is an end view in elevation of the device of Fig.1.

Referring now to the drawings on which like characters of reference are employed to designate like parts throughout the several views, there is shown thereon a right angle base generally referred to by numeral 10 having two elongated slots 11 therein through which an adjustable bellows block 12 is secured by screws 13. Bellows block 12 is provided with an opening 14 adapted to receive a threaded extremity 15 of a bellows 17, a metallic tube 16 also being disposed in the opening 14 and secured, in any suitable manner, to the threaded extremity 15 of the bellows 17. Tube 16 is arranged in such a manner as to extend exteriorly of the switch whereby a suitable value of pressure may be caused to react on the bellows 17 through the tube 16. When the switch is employed in the aforesaid torpedo motion recorder, tube 16 extends through an opening in the torpedo casing such that for submarine firing the pressure of the water contained in the torpedo firing tube reacts on the interior of bellows 17. When it is desired to fire the torpedo from the deck of a surface vessel, air pressure is applied to the tube by any suitable mechanical means.

Figure 3:
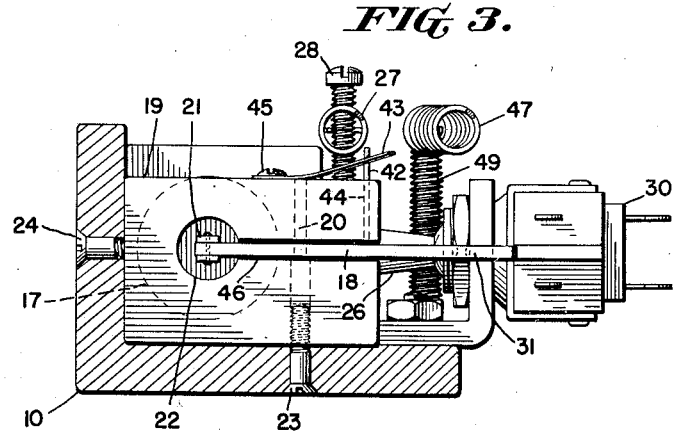
Fig. 3 is a sectional view taken substantially along the line 3—3 of Fig. 1.
Figure 4:
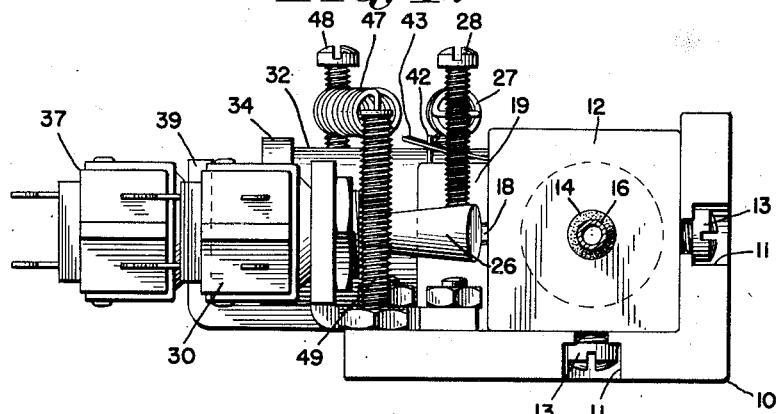
Fig. 4 is an end view in elevation of the opposite end of the device shown in Fig. 2.
Figure 5:
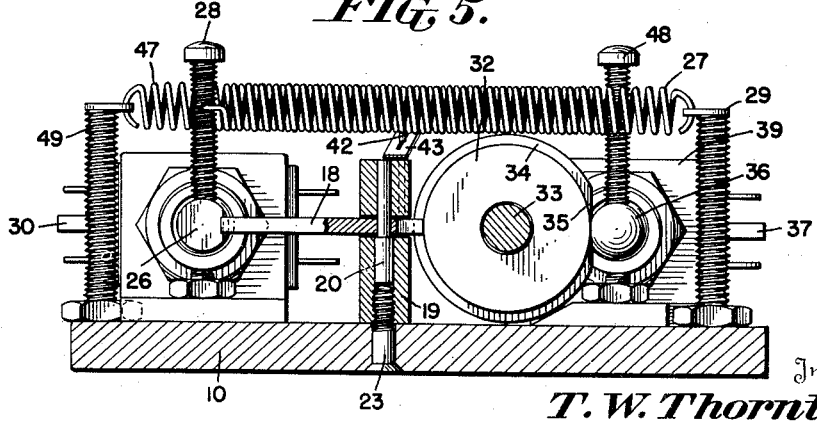
Fig. 5 is a sectional view taken substantially along line 5—5 of Fig. 1.

When a predetermined value of pressure is applied to the interior of bellows 17, the bellows is caused to expand, pressing on one arm of a latch member 18 which is held in a latch member supporting block 19 by pivot pin 20. Connection between latch member 18 and bellows 17, Figs. 1 and 3, is provided by means of a bifurcated member 21 which is secured to the movable end of the aforesaid bellows 17, number 21 extending into an opening 22 in the supporting block 19. The latch member pivot pin 20 is held in the supporting block 19 by a screw 23, Fig. 3, which together with a screw 24, secures supporting block 19 to base 10.

Figure 6:
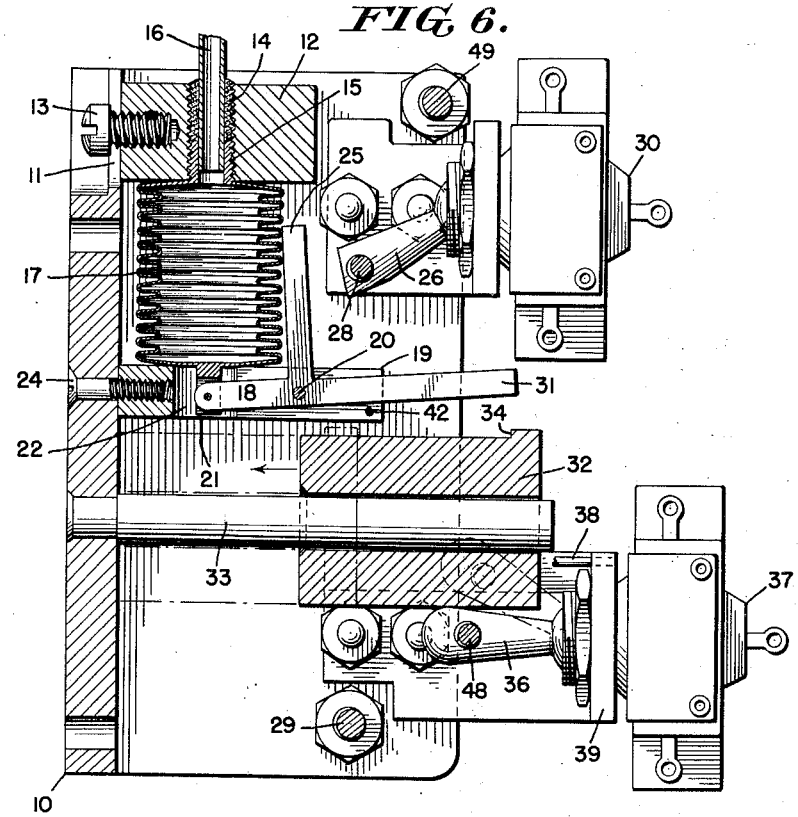
Fig. 6 is a section view with certain parts in elevation showing one of the switches thereof in its operated position.
Figure 7:
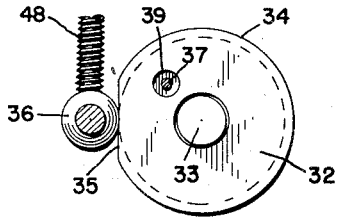
Fig. 7 is a detailed view of the inertial member and switch arm associated therewith.

The expansion of bellows 17, Figs. 1 and 6, causes latch member 18 to rotate about pivot pin 20, right angle extension 25 of latch member 18 moving toward bellows 17, thereby releasing toggle switch arm 26 for movement under power of a coil spring 27 operatively secured thereto by screw 28. The opposite end of spring 27 is secured to base 10 by a screw 29. Rotation of latch member 18 also causes an extension 31 thereof to rotate away from an inertia member 32, thereby releasing member 32 for movement along a guide rod 33 associated therewith. Inertia member 32 is provided with a cylindrical bore adapted to receive guide rod 33, one end of rod 33 being secured to base 10 by any suitable means, such as riveting.

Movement of inertia member 32 along rod 33 is caused by the set back force of the torpedo when it is fired, guide rod 33 being parallel to the line of motion of the torpedo. Prior to the application of pressure to bellows 17 and the subsequent rotation of extension 31, the inertia member 32 is releasably maintained in its initial position by the engagement of extension 31 with a shoulder 34 formed integrally with member 32. In order to ensure the locking action of latch member 18 until pressure has been applied to the bellows, an orientation pin 38, is secured to the right angle toggle switch supporting member 39 and is inserted in an orifice 41 in the inertia member before the inertia member is set in its initial locked position. This arrangement ensures that the flattened section 35 of shoulder 34 of the inertia member 32 is always placed adjacent to toggle switch arm 36 of toggle switch 37 and that the flattened section 35 is prevented from engaging latch member extension 31. After pressure has been applied to the bellows 17, rotation of latch member 18 frees switch arm 26 for operation and inertia member 32 for movement along rod 33 as heretofore described.

To prevent relocking of the inertia member while in its initial position, a locking pin 42 is arranged in an orifice 44 in the supporting block 19 and maintained therein by a locking pin spring 43 which is secured to supporting block 19 by a screw 45. Pin 42 rests on latch member 18 and upon sufficient rotation of the latch member is caused to move across the entire width of the latch member channel 46 by spring 43, thus preventing any return of latch member 18 toward the initial position thereof and the resultant relocking of inertia member 32 that would follow from a decrease of pressure in bellows 17. The movement of inertia member 32 along guide rod 33 is initiated by the forward motion of the torpedo which produces a set back force in excess of that required to move member 32, whereby positive action of said member 32 is always assured. When the torpedo is fired, inertia member 32 moves along guide rod 33 until said member 32 comes to rest against base 10, thereby releasing toggle switch arm 36 for movement under power of coil spring 47 operatively secured thereto by a screw 48, the opposite end of spring 47 being secured to base 10 by a screw 49.

Figure 8:
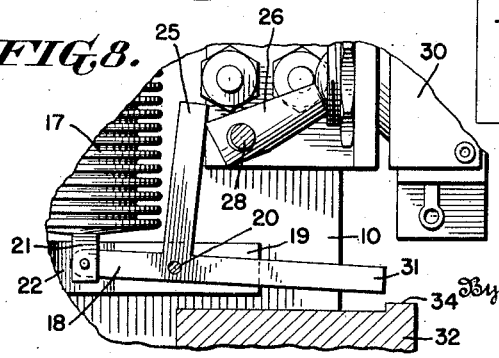
Fig. 8 is a fragmentary view showing an alternate form of the device in the present invention.

Referring now to Fig. 8, an alternate form of the device is shown in which latch member 18 has been operated by fluid pressure applied to bellows 17, and the latch member 18 is prevented from returning to its initial position by toggle switch arm 26. This differs from the previously described embodiment of Fig. 6 in that latch member locking pin 42 and the accompanying locking pin spring 43 are not present in the device, their function being performed by the aforementioned action of toggle switch arm 26. The device of the invention herein described is otherwise unchanged from the preferred form originally described.

Figure 9:
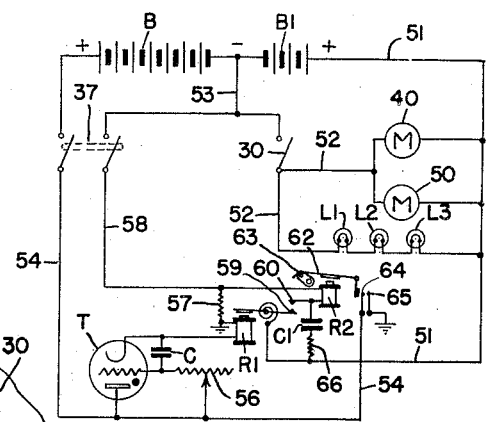
Fig. 9 illustrates in diagrammatic form a complete electrical system suitable for use with the present invention.

Referring now to Fig. 9, there is shown thereon an electrical system embodying the device of the present invention and adapted for use in connection with instruments used to measure and to record data during torpedo runs.

When pressure has been applied to bellows 17, initiating the previously described action, whereby latch member 18 pivots and allows switch 30 to close, such action thereby closes a circuit from the positive terminal of battery $B_1$, through conductor 51, through gyroscope motors 49 and 50 and illumination lights $L_1$, $L_2$ and $L_3$, over conductor 52, through pressure switch 30 from whence the circuit is completed to negative terminal of battery $B_1$, through conductor 53. When this occurs, suitable operating potential is applied to the motors and to illumination lights $L_1$, $L_2$, and $L_3$, whereby the gyroscopes associated with the motors are rendered effective to substantially maintain the torpedo on a predetermined course. Application of voltage to Lamps $L_1$, $L_2$, and $L_3$ causes the lamps to illuminate the interior of the torpedo, thereby to facilitate the taking of photographs within the torpedo casing.

When inertia switch 37 closes, a circuit is completed from the positive terminal of battery B through switch 37 and conductor 54 to thyratron tube T, thereby supplying normal operating potential to the plate of tube T. From conductor 54 I also supply voltage to the variable arm of resistor 56, one end of said resistor 56 being connected to the control grid of tube T and a condenser C. The opposite terminal of condenser C is connected to the cathode of tube T, the cathode in turn being connected through a relay winding $R_1$, to the casing or ground of the torpedo. The application of voltage to these points causes condenser C to start charging through resistor 56, its rate of charge being determined by the setting of the variable arm of resistor 56. As condenser C continues to charge, the necessary potential on the control grid of thyratron T is reached to cause firing of the thyratron T. When this occurs, current immediately starts to flow from the positive terminal of battery B through inertia switch 37 and conductor 54 to the plate of tube T, through tube T and relay winding $R_1$, to ground, and from ground through resistor 57, conductor 58 and inertia switch 37 to conductor 53 and thence to the negative terminal of battery B.

This flow of current through relay winding $R_1$ causes contacts 59 and 60 to close, thereby completing a circuit from the positive potential of battery $B_1$ through conductor 51 and contacts 59 and 60, relay winding $R_2$ to conductor 58 and back to the negative terminal of battery $B_1$. Current then flows through this circuit, causing relay arm 62 to be pulled down, to operate camera shutter 63 and causing contact 64 to be brought into engagement with contact 65 thereby grounding conductor 54. When this occurs, the circuit through tube T and relay winding $R_1$ is shorted out, causing tube T to extinguish. This loss of current causes the magnetic field of relay $R_1$ to collapse, releasing contacts 59 and 60, and the circuit of relay winding $R_2$, thereby causing the camera shutter to be returned to its initial position and also releasing contacts 64 and 65. As the shutter is restored to its initial position and contacts 64 and 65 are released, at the conclusion of said action, the system has completed a cycle of operation and is ready to start another cycle. Resistor 57 is provided in order to limit the current flow to the negative terminal of battery B when contacts 64 and 65 are engaged. Condenser C and resistor 66 are inserted for smoothing of any transients that occur from the engagement of contacts 59 and 60. It should be noted that each time condenser C is recharged to a value sufficient to cause tube T to break down, the foregoing cycle of operation is repeated.

From the above explanation it is evident that the duration of one cycle of operation is very short, thereby ensuring a sufficiently rapid rate of exposure to obtain an accurate record of the indicating instruments in the torpedo while the device is operating and that the time between cycles may be varied by varying the value of resistor 56.

From the foregoing it should now be apparent that a hydro-inertia switch has been provided which is well adapted to fulfill the aforesaid objects of the invention.

Whereas the invention has been described with reference to a particular example thereof which gives satisfactory results, it readily will be apparent to those skilled in the art, after understanding the invention, that various changes and modifications may be made without departing from the spirit and scope of the invention and it is my intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A circuit controlling mechanism of the character disclosed comprising, in combination, circuit controlling means including a spring biased lever adapted to move from an initial position to a moved position and to operate the circuit controlling means as the lever moves into said moved position thereof, movable means adapted to releasably maintain the lever in said initial position thereof until a predetermined setback force has been applied to said movable means, and pressure controlled means adapted to prevent movement of said movable means until a predetermined value of pressure is applied to the pressure controlled means.

2. A circuit controlling mechanism of the character disclosed comprising a plurality of circuit closing means each having an initial position and a circuit closing position, a plurality of resilient means respectively associated with said plurality of circuit closing means and adapted to cause movement thereof between said positions, means responsive to changes in a physical variable and adapted to releasably maintain one of said plurality of circuit closing means in the initial position thereof until a predetermined change in the physical variable occurs, means responsive to changes in a different physical variable and adapted to maintain another of said plurality of circuit closing means in the initial position thereof until a predetermined change in the different physical variable occurs, and means operatively connected to said first named responsive means and operable by changes in said first physical variable for rendering changes in said different physical variable ineffective to operate said other one of the circuit closing means until changes in said first physical variable occur.

3. A circuit controlling mechanism of the character disclosed comprising a plurality of circuit closing means each having an initial position and a circuit closing position, a plurality of resilient means respectively associated with said plurality of circuit closing means and adapted to cause movement thereof between said positions, movable means adapted to releasably maintain one of said plurality of circuit closing means in the initial position thereof until a predetermined amount of set back force is applied to the movable means, and pressure controlled means adapted to releasably maintain another one of said plurality of circuit closing means in the initial position thereof and to prevent movement of said movable means until a predetermined amount of pressure is applied to the pressure controlled means.

4. A circuit controlling mechanism of the character disclosed comprising circuit closing means having an initial position and a circuit closing position, a resilient member adapted to move the circuit closing means between said positions, movable means for releasably maintaining said circuit closing means in the initial position thereof until a predetermined set back force has been applied to the movable means, and pressure responsive means for preventing movement of said movable means until a predetermined pressure has been applied to the pressure responsive means.

5. A circuit controlling mechanism of the character disclosed comprising a plurality of circuit closing means each having an initial position and a circuit closing position, a plurality of resilient means respectively associated with said plurality of circuit closing means and adapted to move the circuit closing means between said positions, a first means responsive to changes in a physical variable and adapted to releasably maintain one of said plurality of circuit closing means in the initial position thereof against the force of the resilient means associated therewith until a predetermined change in said physical variable occurs, a second means responsive to changes in a different physical variable and adapted to releasably maintain another one of said plurality of circuit closing means in the initial position thereof against the force of the resilient means associated therewith until a predetermined change in the different physical variable occurs, and means including said first means and adapted to render said second means ineffective until said predetermined change in said physical variable occurs.

6. A circuit controlling mechanism of the character disclosed comprising a plurality of circuit closing means each having an initial position and a circuit closing position, a plurality of resilient means respectively associated with said plurality of circuit closing means and adapted to move the circuit closing means between said positions, pressure controlled means, a rotatable latch member operatively secured to the pressure controlled means and rotatable thereby and adapted to releasably maintain one of said plurality of circuit closing means in the initial position thereof until a predetermined amount of pressure is applied to the pressure controlled means, and inertia responsive means controlled by said maintaining means and adapted to render another of said plurality of resilient means effective to move the circuit closing means associated therewith when a predetermined set back force is applied to the inertia responsive means after the latch member has rotated a predetermined amount.

7. A circuit controlling mechanism of the character disclosed comprising a plurality of circuit closing means each having an initial position and a circuit closing position, a plurality of resilient means respectively associated with said plurality of circuit closing means and adapted to move the circuit closing means to the circuit closing position thereof, pressure controlled movable means, a rotatable latch member adapted to be rotated by said pressure controlled means and adapted to releasably maintain one of said plurality of circuit closing means in the initial position thereof until the latch member has rotated a predetermined amount, inertia responsive means adapted to be releasably locked by said latch member until the latch member has rotated said predetermined amount, said inertia responsive means also being adapted to releasably maintain another of said plurality of circuit closing means in the initial position thereof until a predetermined set back force is applied to the inertia responsive means, and means adapted to provide a predetermined orientation of said inertia responsive means with respect to the circuit controlling means associated therewith.

8. A circuit controlling mechanism of the character disclosed comprising circuit controlling means including a spring biased lever adapted to move from an initial position to a moved position and to operate the circuit controlling means as the lever moves into said moved position thereof, movable means adapted to releasably maintain the lever in said initial position thereof until a predetermined setback force is applied to said movable means, a rotatable latch member adapted to releasably maintain said movable means in a position to maintain the lever in said initial position, and a bellows responsive to fluid pressure and adapted to rotate said latch member to release said movable means when a predetermined value of pressure is applied to the bellows.

9. A circuit controlling mechanism of the character disclosed comprising circuit controlling means including a spring biased lever adapted to move from an initial position to a moved position and to operate the circuit controlling means as the lever moves into said moved position thereof, a second circuit controlling means including another spring biased lever adapted to move from an initial position to a moved position and to operate the second circuit controlling means as the last named lever moves into said moved position thereof, a movable member adapted to releasably maintain said last named lever in the initial position thereof until a predetermined set back force is applied to the movable member, and means including a pressure controlled bellows and adapted to prevent movement of said movable member and to releasably maintain said first named lever in the initial position thereof until a predetermined amount of pressure has been applied to said bellows.

10. A circuit controlling mechanism of the character disclosed comprising two switches each having an initial position and a circuit closing position, two springs respectively associated with said switches for moving the switches between said positions, a pressure controlled bellows, a rotatable latch member operatively secured to said bellows and rotatable thereby and adapted to releasably maintain one of said switches in the initial position thereof until a predetermined amount of pressure is applied to the bellows, and an inertia element adapted to be rendered ineffective by said latch member until a predetermined rotation of the latch member occurs, said inertia element also being adapted to releasably maintain the other of said switches in the initial position thereof until a predetermined set back force is applied to the inertia element.

THEODORE W. THORNTON.

REFERENCES CITED

The following references are of record in the file of this patent:

UNITED STATES PATENTS

| Number | Name | Date |
|---|---|---|
| 2,053,944 | Cooney | Sept. 8, 1936 |
| 2,199,122 | White | Apr. 30, 1940 |